(12) United States Patent
Kuo (10) Patent No.: US 9,395,269 B2
(45) Date of Patent: Jul. 19, 2016

(54) DEVICE FOR HOLDING VOICE COIL MOTOR DURING TESTS AND TEST FIXTURE FOR TESTING VOICE COIL MOTOR

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 324 days.

(21) Appl. No.: 14/192,747

(22) Filed: Feb. 27, 2014

(65) Prior Publication Data
US 2014/0260703 A1    Sep. 18, 2014

(30) Foreign Application Priority Data
Mar. 13, 2013   (TW) .............................. 102108921 U (51) Int. Cl.
*G01N 33/00*    (2006.01)
*G01M 13/02*    (2006.01)

(52) U.S. Cl.
CPC .................................. *G01M 13/025* (2013.01)

(58) Field of Classification Search
CPC ..................................................... G01M 13/025
USPC ........................................................ 73/865.8
See application file for complete search history.

(56) References Cited

U.S. PATENT DOCUMENTS 5,731,952 A * 3/1998 Ohgami ................ G06F 1/1616
361/679.47

* cited by examiner

*Primary Examiner* — Hezron E Williams
*Assistant Examiner* — Rodney T Frank
(74) *Attorney, Agent, or Firm* — ScienBiziP, P.C.

(57) ABSTRACT

A device includes a holder, a cover, a socket, a number of first pins, and a number of second pins. The holder defines a holding groove in its upper surface for holding a voice coil motor. The holder also defines a pin groove in its right sidewall communicating with the holding groove. The voice coil motor has electrodes facing the pin groove. The cover covers the upper surface to fix the voice coil motor in the holder. The socket is attached to the right sidewall. The first pins are fixed in the socket to connect with the electrodes. The second pins are connected with the first pins. The second pins connect with a number of third pins of a testing fixture for testing the voice coil motor when the device is assembled into the testing fixture.

8 Claims, 9 Drawing Sheets

DEVICE FOR HOLDING VOICE COIL MOTOR DURING TESTS AND TEST FIXTURE FOR TESTING VOICE COIL MOTOR

BACKGROUND

1. Technical Field

The present disclosure relates to voice coil motors, and particularly to a device for holding a voice coil motor during various quality tests and a test fixture for testing the voice coil motor.

2. Description of Related Art

To ensure quality, voice coil motors need to pass various tests, such as a stroke test, a dynamic tilt test, and a 3-posture test, before being used in camera modules. As such, the voice coil motors need to be installed to and uninstalled from different testing fixtures in order to perform different tests, in such action connecting parts, such as electrodes, of the voice coil motor may be scratched or damaged.

Therefore, it is desirable to provide a device for holding a voice coil motor during tests and a testing fixture for testing the voice coil motor that can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Embodiments of the present disclosure will be described with reference to the drawings.

Figure 1:
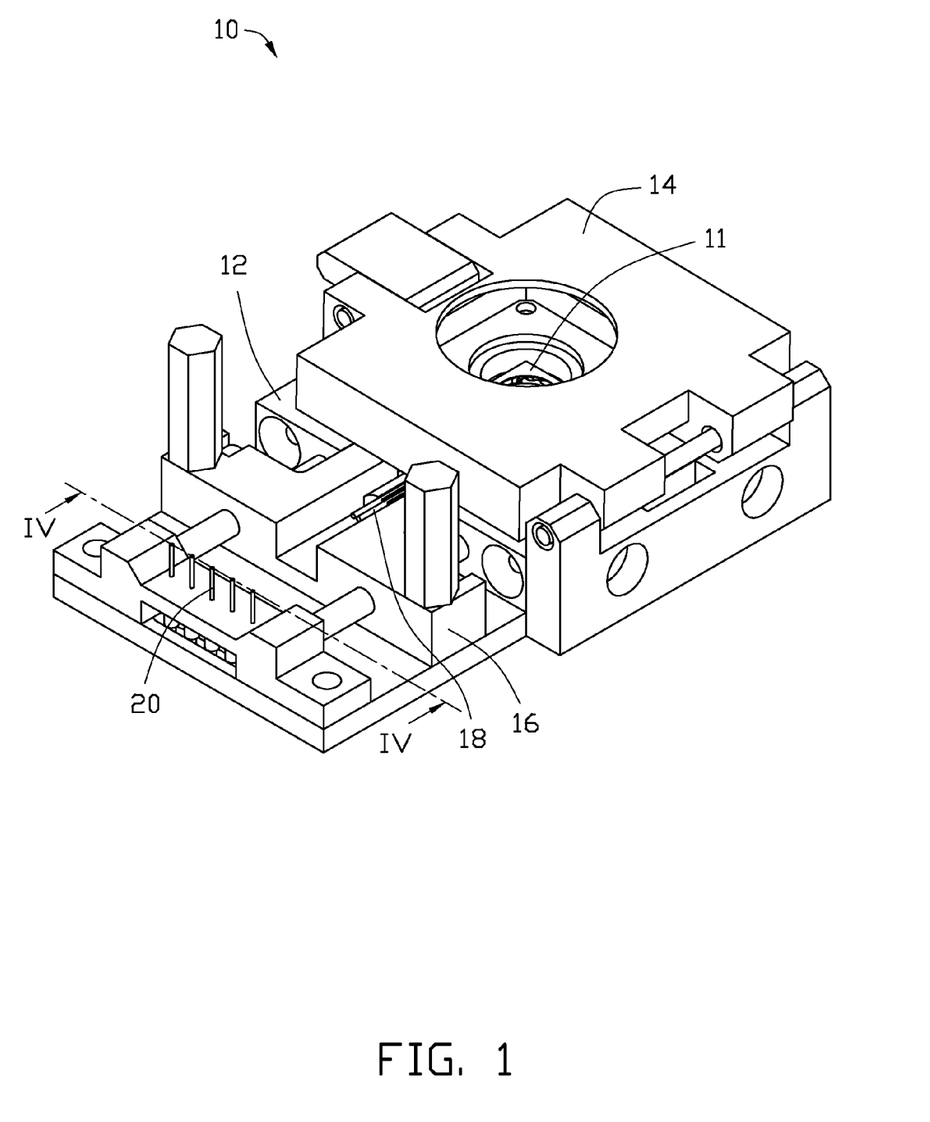
FIG. 1 is an isometric view of a device for holding a voice coil motor during various quality tests, according to an embodiment.

FIG. 1 shows a device 10 for fixing a voice coil motor 11 during various quality tests, such as a stroke test, a dynamic tilt test, and a 3-posture test, according to an embodiment. The device 10 includes a holder 12, a cover 14, a socket 16, a number of first pins 18, and a number of second pins 20.

Figure 2:
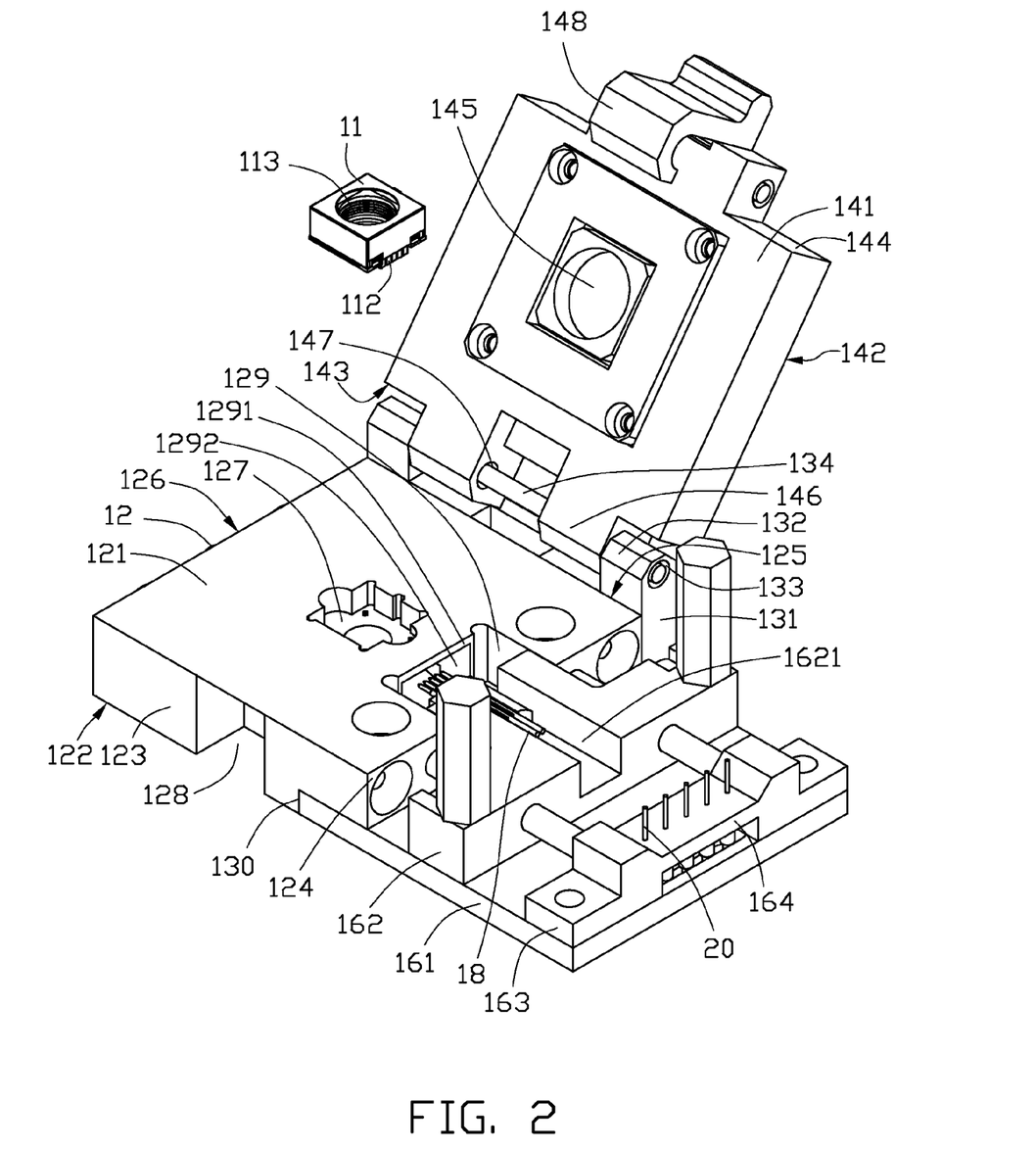
FIG. 2 shows that the voice coil motor is dissembled from the device of FIG. 1.

In this embodiment, the voice coil motor 11 is substantially but is not limited to rectangular and includes a number of gold finger electrodes 112. The voice coil motor 11 is electrically connected with and is communicated with via the electrodes 112. In other embodiments, the electrodes 112 can be in other forms, depending on need. A receiving hole 113 is defined through the voice coil motor 11 for receiving a lens (not shown).

FIG. 2 shows that the holder 12 in this embodiment is rectangular and includes an upper surface 121, a lower surface 122 opposite to the upper surface 121. A front sidewall 123, a right sidewall 124, a back sidewall 125, and a left sidewall 126 are perpendicularly connected between the upper surface 121 and the lower surface 122.

A holding groove 127 is defined in the upper surface 121 of the holder 12 for fittingly receiving the voice coil motor 11. That is, the holding groove 127 has a shape and size substantially similar to the voice coil motor 11. During the tests, the voice coil motor 11 is held in the holding groove 127.

A locking groove 128 is defined in an intersecting portion of the lower surface 122 and the front sidewall 123 of the holder 12. The locking groove 128 is substantially but is not limited to rectangular.

A pin groove 129 is defined in an intersecting portion of the upper surface 121 and the right sidewall 124. The pin groove 129 is substantially but is not limited to rectangular and extends towards the holding groove 127 along a direction that is substantially perpendicular to the right sidewall 124, ending at an end surface 1291. The end surface 1291 is substantially parallel with the right sidewall 124. A through hole 1292 is defined in the end surface 1291 communicating the locking groove 129 with the holding groove 127.

A connecting groove 130 is defined in an intersecting portion of the lower surface 122 and the right sidewall 124. The connecting groove 130 extends through the front sidewall 123 and the back sidewall 125 is substantially but is not limited to rectangular.

The holder 12 also includes a pivoting base 131. The pivoting base 131 is attached to the back sidewall 125 and is substantially but is not limited to rectangular. The pivoting base 131 includes a pair of first pivoting blocks 132 bulging up from a plane that is coplanar with the upper surface 121. The pair of first pivoting blocks 132 is located at two ends of an intersecting line of the upper surface 121 and the back sidewall 125. Each first pivoting block 132 defines a first pivoting hole 133. The first pivoting holes 133 are coaxial with each other and extend in a direction that is substantially parallel with the intersecting line of the upper surface 121 and the back sidewall 125.

The holder 12 also includes a shaft 134 configured for rotatable insertion through the first pivoting holes 133

The cover 14 is substantially but is not limited to rectangular and includes a first surface 141 and a second surface 142 opposite to the first surface 141. A first side surface 143 and a second side surface 144 perpendicularly connecting between the first surface 141 and the second surface 142. The first side surface 143 and the second side surface 144 face each other.

The cover 14 defines an inspection hole 145 extending through the first surface 141 and the second surface 142. The inspection hole 145 is substantially but is not limited to circular.

The cover 14 includes two second pivoting blocks 146 bulging up from the first side surface 143 and adjacent to two ends of an intersecting line of the first side surface 143 and the second surface 142. Each second pivoting block 146 defines a second pivoting hole 147. The second pivoting holes 147 are coaxial with each other and substantially extend along a direction parallel with the intersecting line of the first side surface 143 and the second surface 142.

A hook 148 is formed on the second side surface 144 of the cover 14 configured for engaging with the locking groove 128.

In assembly, the second pivoting blocks 146 are positioned between the first pivoting blocks 132 and the shaft 134 and rotatably insert through the first pivoting holes 133 and the second pivoting holes 14. As such, the cover 14 is pivotably connected to the holder 12 and can be folded or unfolded. When the cover 14 is folded, the upper surface 121 is covered and the inspecting hole 145 aligns with the holding groove 124 to expose the voice coil motor 11 for visual inspection. The hook 148 is engaged with the locking groove 128 fixing the cover 14 in place when the cover 14 is folded. Thus, the voice coil motor 11 is fixed within the holding groove 127.

The socket 16 includes a connecting part 161, a first fixing part 162, and a second fixing part 163.

The connecting part 161 is substantially but is not limited to rectangular and is snugly inserted into the connecting groove 130. The connecting part 161 is fixed to the holder 12 via fasteners (not shown).

Figure 3:
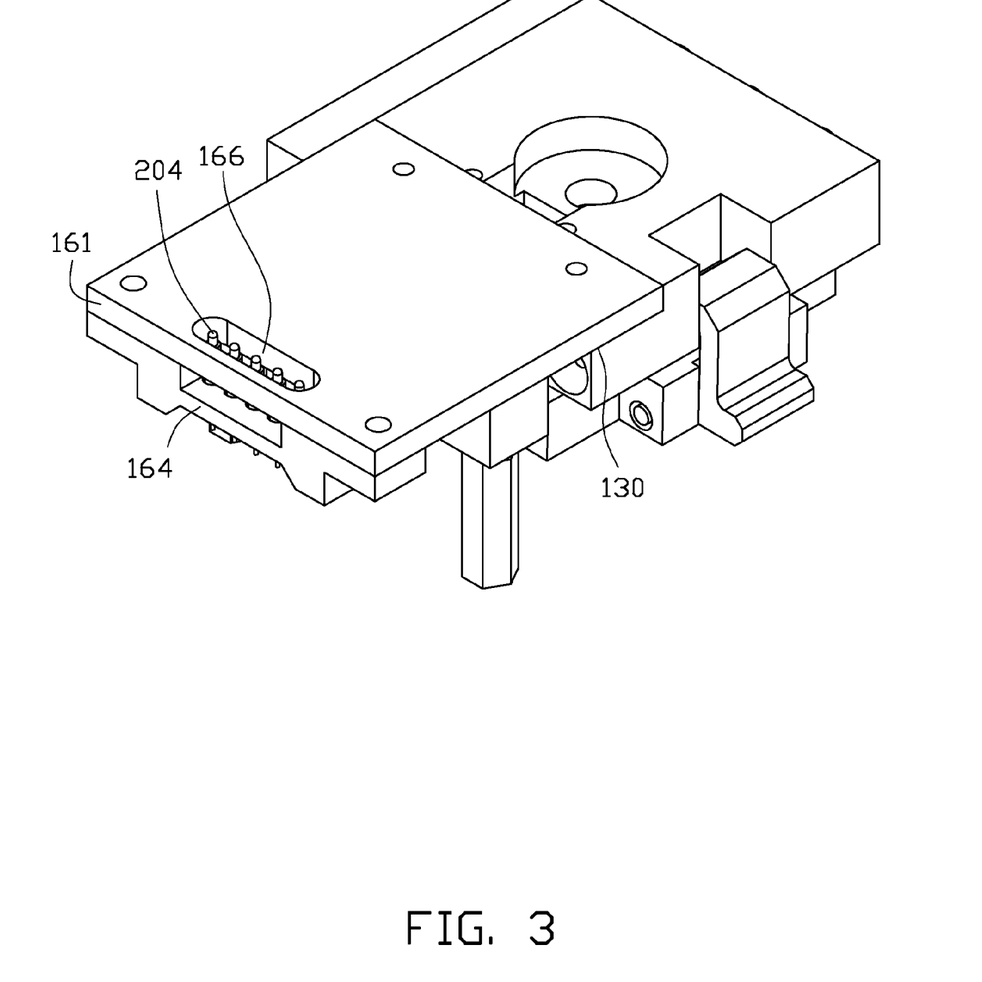
FIG. 3 is similar with FIG. 1 but viewed at another angle.
Figure 4:
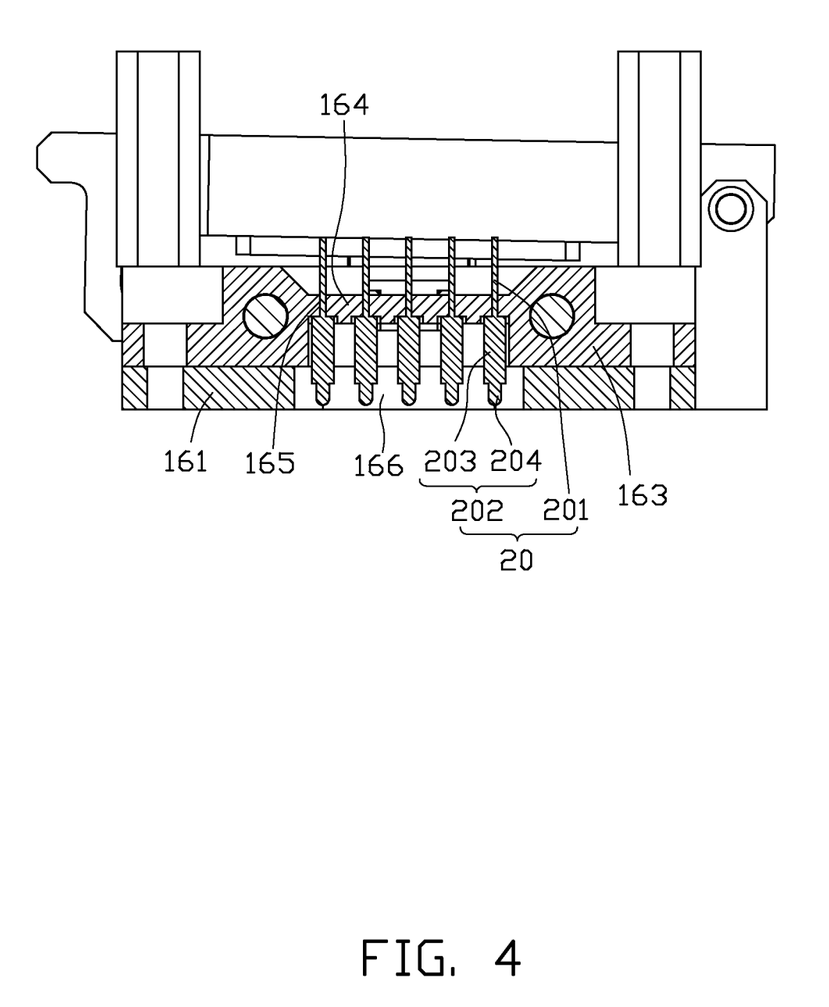
FIG. 4 is a cross-sectional view of the device taken along a line IV-IV of FIG. 1.

FIGS. 3-4 show that the first fixing part 162 is bulged up from the connecting part 161, adjacent to the holder 12, and is partially inserted into the pin groove 129. The first fixing part 162 defines a fixing groove 1621 in a top surface thereof and extends through the first fixing part 162 along a direction that is substantially perpendicular to the end surface 1291. That is, the fixing groove 1621 communicates with the pin groove 129.

The second fixing part 163 is also bulged up from the connecting part 161, distant from the holder 12. The second fixing part 163 includes a fixing board 164, which is substantially parallel with and is spaced away from the connecting part 161. The fixing board 164 defines a number of fixing holes 165 arranged in a line that is substantially parallel with the right sidewall 124. An inserting hole 166 is defined through the connecting part 161 to expose the fixing holes 165.

The first pins 18 are fixed by the first fixing part 162 and extend along a direction that is substantially perpendicular to the right sidewall 124. The first pins 18 are received in the pin groove 129 and the fixing groove 1621 and arranged in a line that is substantially parallel with the upper surface 121. The first pins 18 extend into the holding groove 127 and contact with the electrodes 112.

Each second pin 20 includes a first end 201 and a second end 202. Each first end 201 is snugly inserted through one of the fixing holes 165 from a side of the fixing hole 165 adjacent to the connecting part 161. The first ends 201 are then connected to the first pins 18 via wires (not shown). Each second end 202 includes a first section 203 adjacent to the first end 201 and a second section 204 connecting the first section 203. The second section 204 extends into the inserting hole 166. A size of the first section 203 is larger than a size of the second section 204.

As such, during the tests, the voice coil motor 11 can be connected to testing fixtures by the device 10, rather than manually. That is, the voice coil motor 11 is protected from being scratched and damaged within the device 10.

Figure 5:
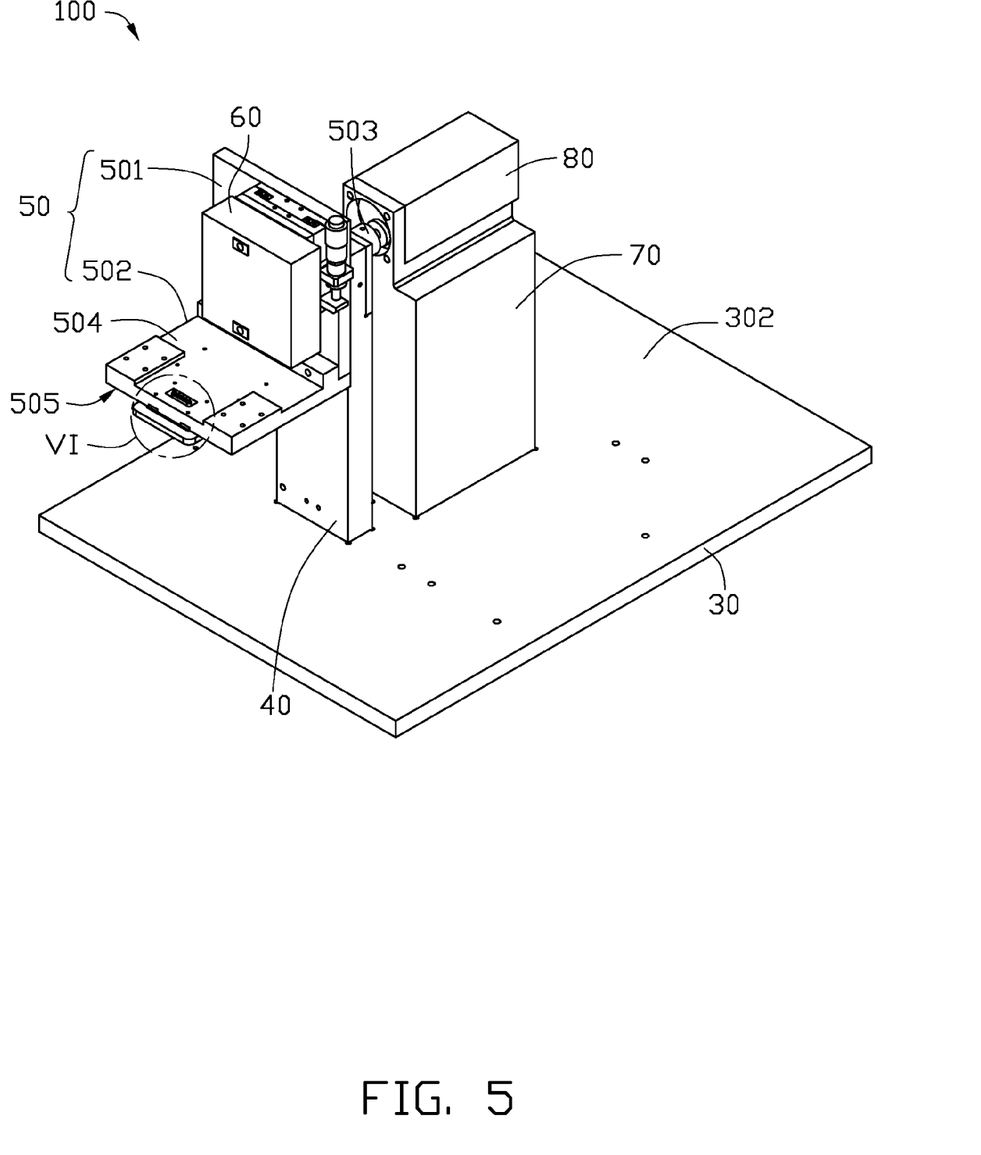
FIG. 5 is an isometric view of a testing fixture for testing the voice coil motor using the device of FIG. 1.

FIG. 5 shows a testing fixture 100 for the 3-posture test according to an embodiment. The testing fixture 100 a worktable 30, a supporting bracket 40, a rotating bracket 50, a laser distance meter 60, a motor support 70, and a motor 80.

The worktable 30 includes a supporting surface 302. The supporting bracket 40 and the motor support 70 are positioned on the supporting surface 302 and are adjacent to each other. The rotating bracket 50 is positioned on the supporting bracket 40. The motor 80 is positioned on the motor support 70. The motor 80 is coupled with the rotating bracket 50 to drive the rotating bracket 50 to rotate relative to the supporting bracket 40.

The supporting bracket 40 is substantially rectangular. A lengthwise direction of the supporting bracket 40 is substantially perpendicular to the supporting surface 302.

The rotating bracket 50 includes a vertical board 501, a horizontal board 502, and a rotating shaft 503. The horizontal board 502 is perpendicularly fixed to a side of the vertical board 501. The rotating shaft 503 is rotatably positioned on the supporting bracket 40. An end of the rotating shaft 503 is fixed to another side of the vertical board 501, opposite to the horizontal board 502, and the other end is coupled to the motor 80. As such, the motor 80 rotates the rotating shaft 503. The vertical board 501 and the horizontal board 502 rotate with the rotating shaft 503.

Figure 6:
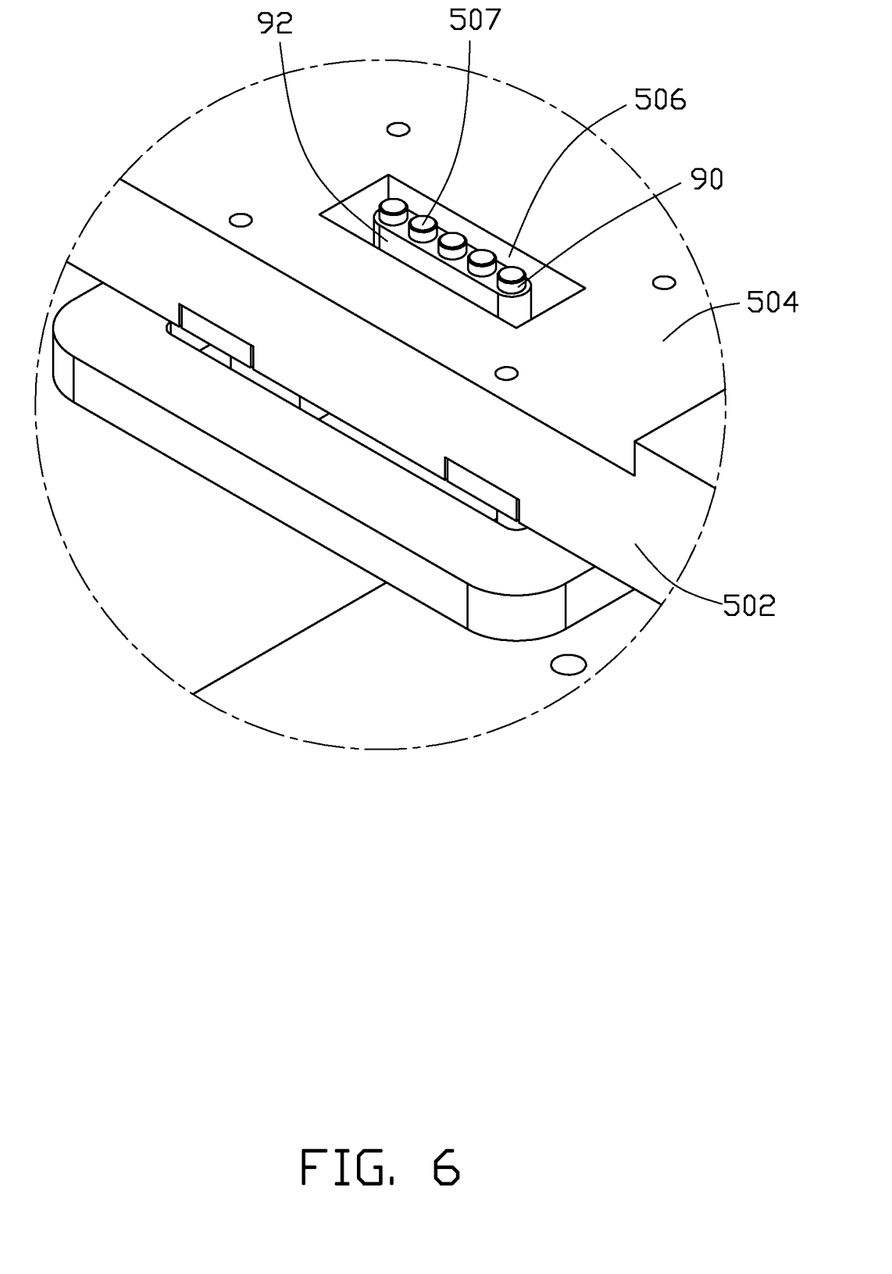
FIG. 6 is an enlarged view of a portion VI of FIG. 5.

FIG. 6 shows that the horizontal board 502 includes a top surface 504 and a bottom surface 505. A slot 506 is defined extending through the top surface 504 and the bottom surface 505. A lengthwise direction of the slot 506 is substantially parallel with the vertical board 501.

The laser distance meter 60 is positioned on the vertical board 501 and above the top surface 504 and configured for measuring a moving distance of an element (FIG. 3), such as the lens, which is received in the receiving hole 113 and driven to move by the voice coil motor 11 for analysis of the 3-posture test.

Figure 7:
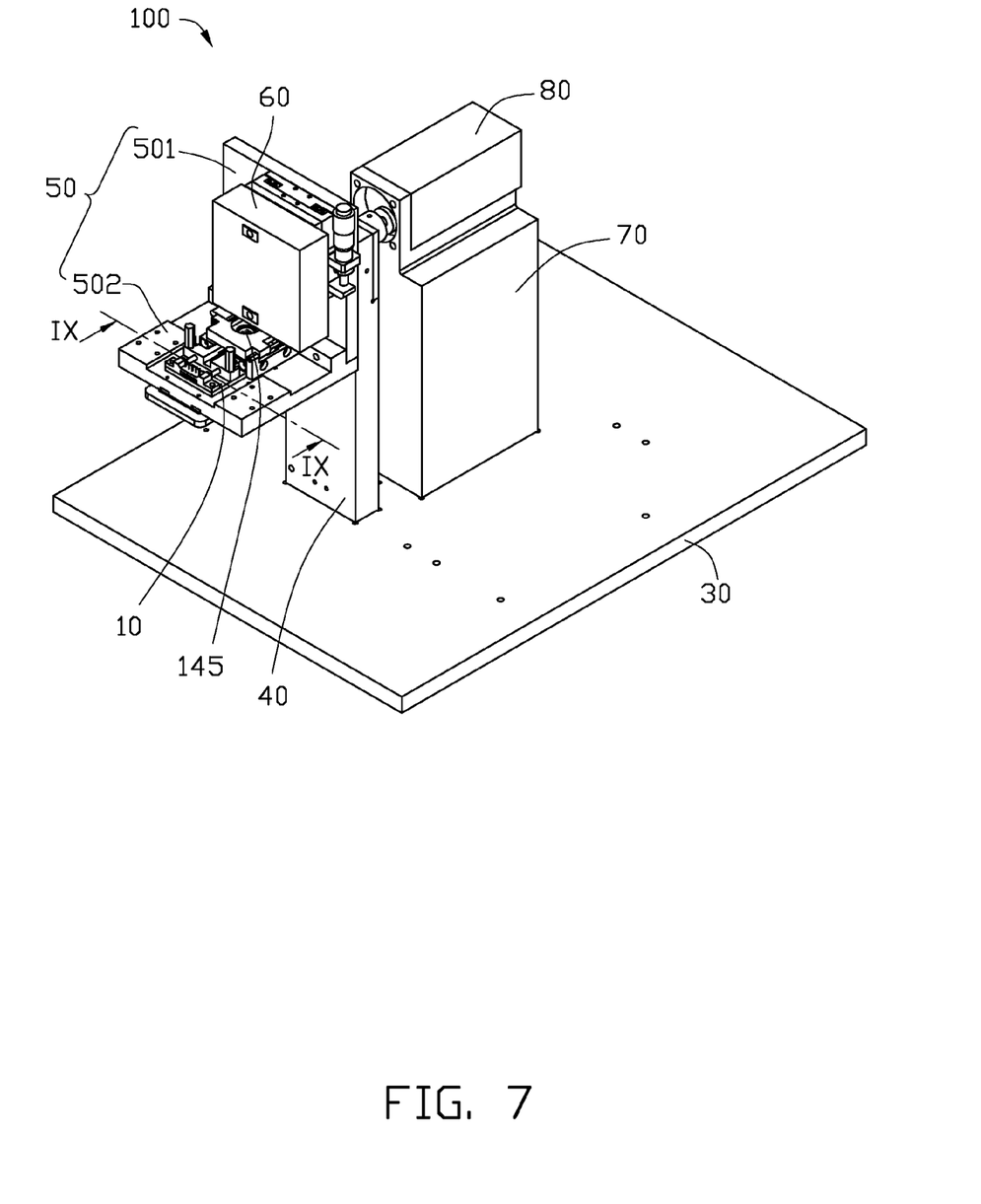
FIG. 7 shows that the device with the voice coil motor of FIG. 1 is assembled into the testing fixture of FIG. 5.
Figure 8:
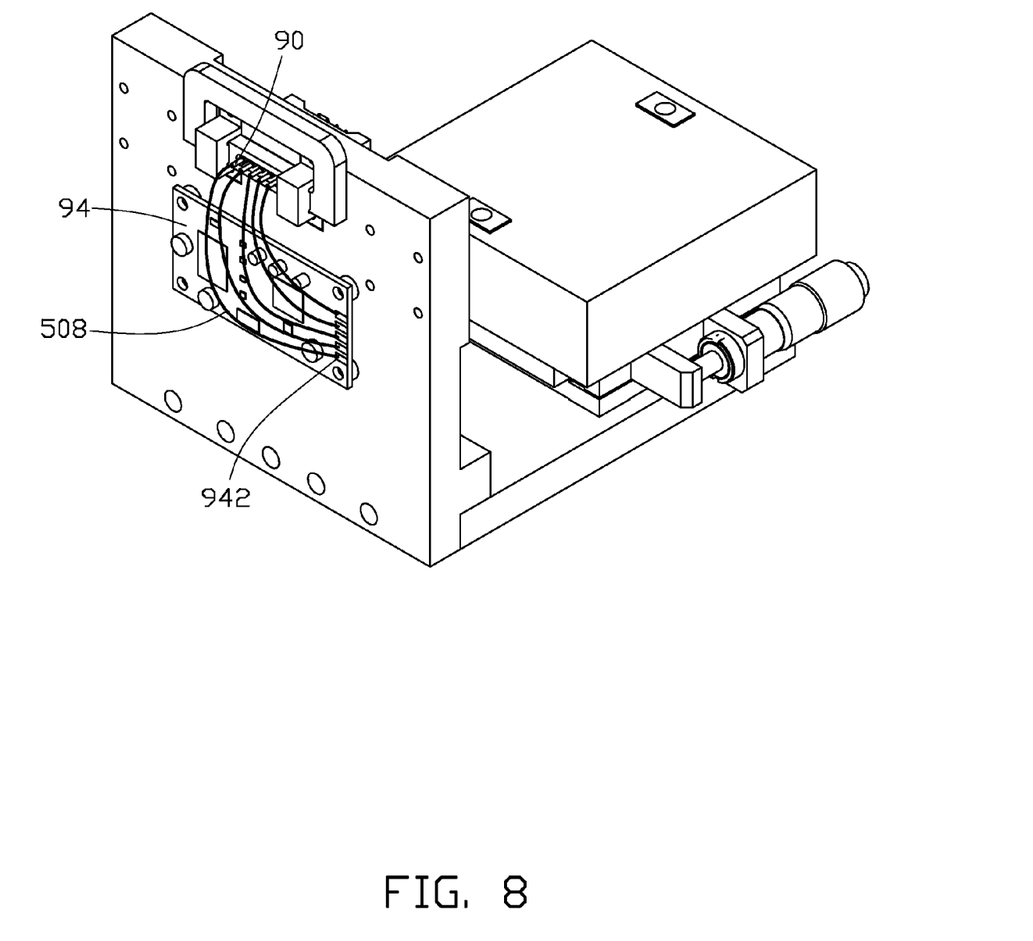
FIG. 8 is similar to FIG. 7 but is viewed at another angle.
Figure 9:
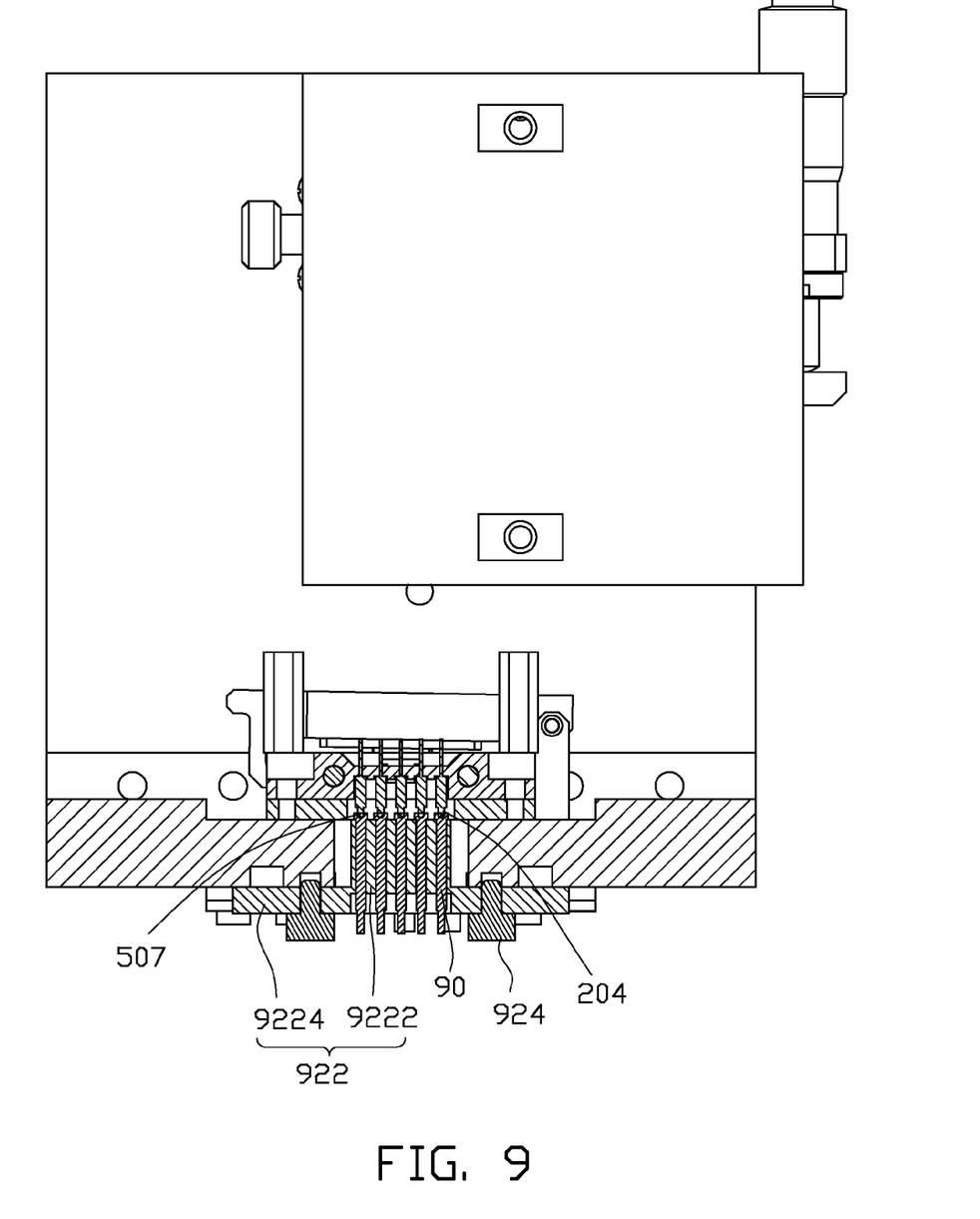
FIG. 9 is a cross-sectional view taken along a line IX-IX of FIG. 7.

FIGS. 7-9 show that the voice coil motor 11 is assembled to the testing fixture 100 by the device 10.

The testing fixture 100 further includes a number of third pins 90, a third fixing part 92, and a detecting circuit board 94.

The third fixing part 92 includes a holding part 922 and a number of fasteners 924. The holding part 922 includes a fixing portion 9222 and an assembling portion 9224. The fixing portion 9222 is inserted into the slot 506 along a direction from the bottom surface 505 to the top surface 504. The assembling portion 9224 has a size larger than a size of the slot 506 and is abutted against the bottom surface 505. The assembling portion 9224 is assembled to the horizontal board 502 via the fasteners 924.

The third pins 90 are fixed by the fixing portion 9222 and arranged long a line that is substantially parallel with the lengthwise direction of the slot 506. Each third pin 90 defines an engaging groove 507 in an end thereof adjacent to the top surface 504.

The detecting circuit board 94 is attached to the bottom surface 505 and includes a number of contacts 942.

In assembly, the device 10 is positioned on the top surface 504. The inserting hole 166 is aligned with the slot 506 and each second section 204 is engaged with one engaging groove 507. As such, each third pin 90 is electrically connected with one electrode 112 via one of the second pins 20 and the first pins 18. Each third pin 90 is also electrically connected to one contact 942 via threads 508. Therefore, the detecting circuit board 94 is connected with the voice coil motor 11 and can drive the voice coil motor 11 to move the element. Movements of the element are measured by the laser distance meter 60 for analysis.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. A device, comprising:
   a holder comprising an upper surface, a right sidewall, and a back sidewall, the right sidewall and the back sidewall all perpendicularly connecting the upper surface, the holder defining a holding groove in the upper surface for holding a voice coil motor therein, the holder also defining a pin groove in the right sidewall and communicating with the holding groove, the voice coil motor having a plurality of electrodes facing the pin groove;
   a cover having a first surface and a first side surface perpendicularly connecting the first surface, the first side surface pivotally connected to an intersection of the upper surface and the back sidewall and configured for covering the upper surface using the first surface to fix the voice coil motor in the holder;
   a socket attached to the right sidewall;
   a plurality of first pins fixed in the socket and inserted through the pin groove to connect with the electrodes; and
   a plurality of second pins fixed in the socket and connected with the first pins, the second pins being configured for connecting with a plurality of third pins of a testing fixture for testing the voice coil motor when the device is assembled into the testing fixture.

2. The device of claim 1, wherein the pin groove ends at an end surface which is substantially parallel with the right sidewall, and the holder defines a through hole in the end surface and communicating the pin groove with the holding groove.

3. The device of claim 2, wherein the holder comprises a lower surface opposite to the upper surface and defines a connecting groove in an intersection of the lower surface and the right sidewall, the socket comprises a connecting part partially inserted into the connecting groove, the socket also comprises a first part bulged up from the connecting part, adjacent to the holder and partially inserted into the pin groove, the first fixing part defines a fixing groove in a top surface thereof and extending through the first fixing part along a direction that is substantially perpendicular to the end surface, the first pins are fixed by the first fixing part and extend along a direction that is substantially perpendicular to the right sidewall, and the first pins are received in the pin groove and the fixing groove and arranged in a line that is substantially parallel with the upper surface.

4. The device of claim 3, wherein the socket also comprises a second fixing part bulged up from the connecting part, distant from the holder, the second fixing part comprises a fixing board, which is substantially parallel with and is spaced away from the connecting part, the connecting board defines a plurality of fixing holes arranged in a line that is substantially parallel with the right sidewall, an inserting hole is defined through the connecting part to expose the fixing holes, each second pin comprises a first end and a second end, each first end is snugly inserted through one of the fixing holes from a side of the fixing hole adjacent to the connecting part, the first ends are connected to the first pins, each second end comprises a first section adjacent to the first end and a second section connecting the first section and extending into the inserting hole, and a size of the first section is larger than a size of the second section.

5. The device of claim 1, wherein the holder comprises a pivoting base attached to the back sidewall, the pivoting base comprises a pair of first pivoting blocks bulging up from a plane that is coplanar with the upper surface, the pair of first pivoting blocks is located at two ends of an intersecting line of the upper surface and the back sidewall, each first pivoting block defines a first pivoting hole, the first pivoting holes are coaxial with each other and extend in a direction that is substantially parallel with the intersecting line of the upper surface and the back sidewall, the cover comprise two second pivoting blocks bulging up from the first side surface and adjacent to two ends of an intersecting line of the first side surface and the first surface, each second pivoting block defines a second pivoting hole, the second pivoting holes are coaxial with each other and substantially extend along a direction parallel with the intersecting line of the first side surface and the first surface, the second pivoting blocks are positioned between the first pivoting blocks, the holder comprises a shaft rotatably inserted through the first pivoting holes and the second pivoting holes.

6. The device of claim 1, wherein the holder further comprises a lower surface and a front sidewall, the lower surface is opposite to the upper surface, the front sidewall perpendicularly connects the upper surface, the lower surface, and the right sidewall, the holder defines a locking groove in an intersecting portion of the lower surface and the front sidewall, the cover comprises a second side surface opposite to the first side surface, and the cover comprises a hook formed on the second side surface and configured for engaging with the locking groove to lock the cover on the holder.

7. The device of claim 1, wherein the holder further comprises a second surface opposite to the first surface, the cover defines an inspection hole extending through the first surface and the second surface, and the inspection hole aligns with the holding groove when the cover covers the upper surface.

8. A testing fixture, comprising:
   a worktable comprising a supporting surface;
   a motor support positioned on the supporting surface;
   a motor supported on the motor support;
   a supporting bracket positioned on the supporting surface;
   a rotating socket supported on the supporting bracket, the rotating socket comprising:
      a rotating shaft rotatably positioned on the supporting bracket and coupled to the motor;
      a vertical board fixed to an end of the rotating shaft and opposite to the motor; and
      a horizontal board fixed to a side of the vertical board and opposite to the rotating shaft, the horizontal board comprising a top surface and a bottom surface opposite to the top surface, and defining a slot extending through the top surface and the bottom surface, a length of the slot being parallel with the vertical board;
   a plurality of third pins;
   a third fixing part comprising a holding part and a plurality of fasteners, the holding part comprising a fixing portion and an assembling portion, the fixing portion being inserted into the slot along a direction from the bottom surface to the top surface, the assembling portion having a size larger than a size of the slot and being abutted against the bottom surface, the assembling portion being assembled to the horizontal board via the fasteners, the third pins being fixed by the fixing portion and arranged long a line that is substantially parallel with the lengthwise direction of the slot, each third pin defining an engaging groove in an end thereof adjacent to the top surface;
   a detecting circuit board attached to the bottom surface and comprising a plurality of contacts connected with the third pins;
   a device positioned on the top surface, comprising:
      a holder comprising an upper surface, a right sidewall, and a back sidewall, the right sidewall and the back sidewall all perpendicularly connecting the upper surface, the holder defining a holding groove in the upper surface for holding a voice coil motor therein, the holder also defining a pin groove in the right sidewall and communicating with the holding groove, the voice coil motor having a plurality of electrodes facing the pin groove;

a cover having a first surface and a first side surface perpendicularly connecting the first surface, the first side surface pivotally connected to an intersection of the upper surface and the back sidewall and configured for covering the upper surface using the first surface to fix the voice coil motor in the holder;

a socket attached to the right sidewall;

a plurality of first pins fixed in the socket and inserted through the pin groove to connect with the electrodes; and a plurality of second pins fixed in the socket and connected with the first pins, the second pins being inserted into and engaged with the engaging grooves; and a laser distance meter positioned on the vertical board and configured for measuring distance of an element received and driven to move by the voice coil motor.

* * * * *